US008832273B1

(12) United States Patent
Li et al.

(10) Patent No.: US 8,832,273 B1
(45) Date of Patent: Sep. 9, 2014

(54) AUTOMATED OPTIMAL WORKLOAD BALANCING DURING FAILOVER IN SHARE-NOTHING DATABASE SYSTEMS

(75) Inventors: Qiang Li, Foster City, CA (US);
Ron-Chung Hu, Palo Alto, CA (US);
HanCheng Hsiung, Union City, CA (US)

(73) Assignee: Symantec Operating Corporation, Mountain View, CA (US)

( * ) Notice: Subject to any disclaimer, the term of this patent is extended or adjusted under 35 U.S.C. 154(b) by 0 days.

(21) Appl. No.: 13/352,919

(22) Filed: Jan. 18, 2012

Related U.S. Application Data

(63) Continuation of application No. 11/182,907, filed on Jul. 15, 2005.

(51) Int. Cl.
*G06F 15/173* (2006.01)
*G06F 15/167* (2006.01)

(52) U.S. Cl.
USPC ............................ 709/226; 709/215; 709/216

(58) Field of Classification Search
CPC .................................................. G06F 9/5083
USPC .................. 709/215–216, 226; 714/714–715
See application file for complete search history.

(56) References Cited

U.S. PATENT DOCUMENTS

| | | | | |
|---|---|---|---|---|
| 5,634,125 A * | 5/1997 | Li | ......................................... | 1/1 |
| 5,687,369 A * | 11/1997 | Li | ......................................... | 1/1 |
| 5,970,495 A * | 10/1999 | Baru et al. | ............................ | 1/1 |
| 6,101,508 A * | 8/2000 | Wolff | ............................. | 709/223 |
| 2002/0023069 A1* | 2/2002 | Blank et al. | ........................ | 707/1 |
| 2002/0099521 A1* | 7/2002 | Yang et al. | ..................... | 702/186 |
| 2005/0177833 A1* | 8/2005 | Sauermann | ................... | 718/105 |
| 2006/0190243 A1* | 8/2006 | Barkai et al. | ....................... | 704/8 |
| 2007/0226220 A1* | 9/2007 | Aronoff et al. | .................... | 707/8 |

\* cited by examiner

*Primary Examiner* — Rupal Dharia
*Assistant Examiner* — Wing Ma
(74) *Attorney, Agent, or Firm* — Campbell Stephenson LLP

(57) ABSTRACT

Procedures and systems may be used for assigning data partitions to data-processing host computers, for example, to initially assign data partitions at the outset of a large data-processing job or during failover measures taken in response to a failed host in a share-nothing database management system (SN-DBMS). In one implementation, a method of managing exclusive access to a data partition within a database system assesses a first host and a second host that have exclusive access to a first and second data partition, respectively, within a database system. The method assigns exclusive access of the data partition to one of the first and second hosts based on factors that may include the processing powers of first and second the hosts, and on processing requirements (such as data quantity and data criticalness) for data on the first and second data partitions.

22 Claims, 6 Drawing Sheets

AUTOMATED OPTIMAL WORKLOAD BALANCING DURING FAILOVER IN SHARE-NOTHING DATABASE SYSTEMS

CROSS-REFERENCE TO RELATED APPLICATIONS

This application is a continuation application of U.S. patent application Ser. No. 11/182,907, entitled "Automated Optimal Workload Balancing During Failover in Share-Nothing Database Systems," filed Jul. 15, 2005, and naming Qiang Li, Ron-Chung Hu, HanCheng Hsiung as inventors. That application is assigned to Symantec Operating Corporation, the assignee of the present invention, and is hereby incorporated by reference, in its entirety and for all purposes.

BACKGROUND

FIG. 1 is a block diagram of a computing cluster 100. The cluster 100 includes four host computers 110, 120, 130, and 140. The host computers may each be referred to as a host or as a node. Each host in the cluster 100 may include one or more central processing units (CPUs) supported by internal memory and software for performing calculations. In various situations, a series of calculations may be performed on a large amount of data. For example, a compilation of business transactions, such as credit-card, point-of-sale, or banking transactions may need to be applied to a series of accounts or may need to be processed to generate billing statements. Similarly, a series of calculations may need to be performed in parallel for physical, chemical, or biological research. To reduce the overall time of performing the calculation, the data may be subdivided into two or more data partitions, and each data partition may then be processed by a dedicated host. The hosts may thus work in parallel to reduce the overall computation time for processing the data.

As illustrated in FIG. 1, the four hosts 110, 120, 130, and 140 are connected to each other. The connections may be made through dedicated links or through a network, such as a local area network (LAN). Each host is also connected with a data server dedicated to the host. In the illustrated example, host 110 is connected with a data server 112; host 120 is connected with a data server 122; host 130 is connected with a data server 132; and host 140 is connected with a data server 142. This configuration may be described as a "share-nothing" architecture, since host computers in this configuration do not share memory or data servers. The data servers each provide data to only one data-processing host. Each data partition is thus associated with one host computer.

A computing cluster may also use larger numbers of host computers. In general, larger clusters may more quickly process data, since the data to be processed can be spread among a greater number of hosts. However, various scalability issues may arise as the number of hosts is increased.

SUMMARY OF THE INVENTION

Described herein are procedures and systems that may be used for assigning data partitions to data-processing host computers. These procedures and systems may be used, for example, to initially assign data partitions at the outset of a large data-processing job. These procedures and systems may also be used as part of a failover procedure, in which a system that is in the midst of a data processing job may recover from the failure of one or more data processing hosts.

In one implementation, a method of managing exclusive access to a data partition within a database system makes assessments of the status of a first host and a second host within a database system. The first host has exclusive access to a first data partition and the second host has exclusive access to a second data partition. The method calculates a first value for the first host and a second value for the second host. The first value is calculated as a function of a first processing power of the first host and of a first processing requirement for a first quantity of data on the first data partition. The second value is calculated as a function of a second processing power of the second host and of a second processing requirement for a second quantity of data on the second data partition. The first and second processing requirements may be based on factors such as data quantity and data criticalness. The method compares the first and second values, and assigns exclusive access of the data partition to one of the first and second hosts based on the comparison.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art with reference to the accompanying drawings. The use of the same reference number throughout the figures designates a like or similar element.

DETAILED DESCRIPTION

Figure 1:
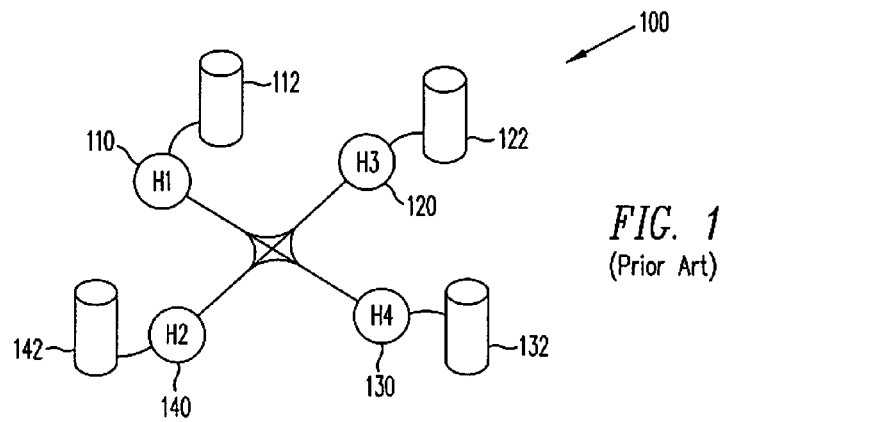
FIG. 1 is a block diagram of a computing cluster.
Figure 2:
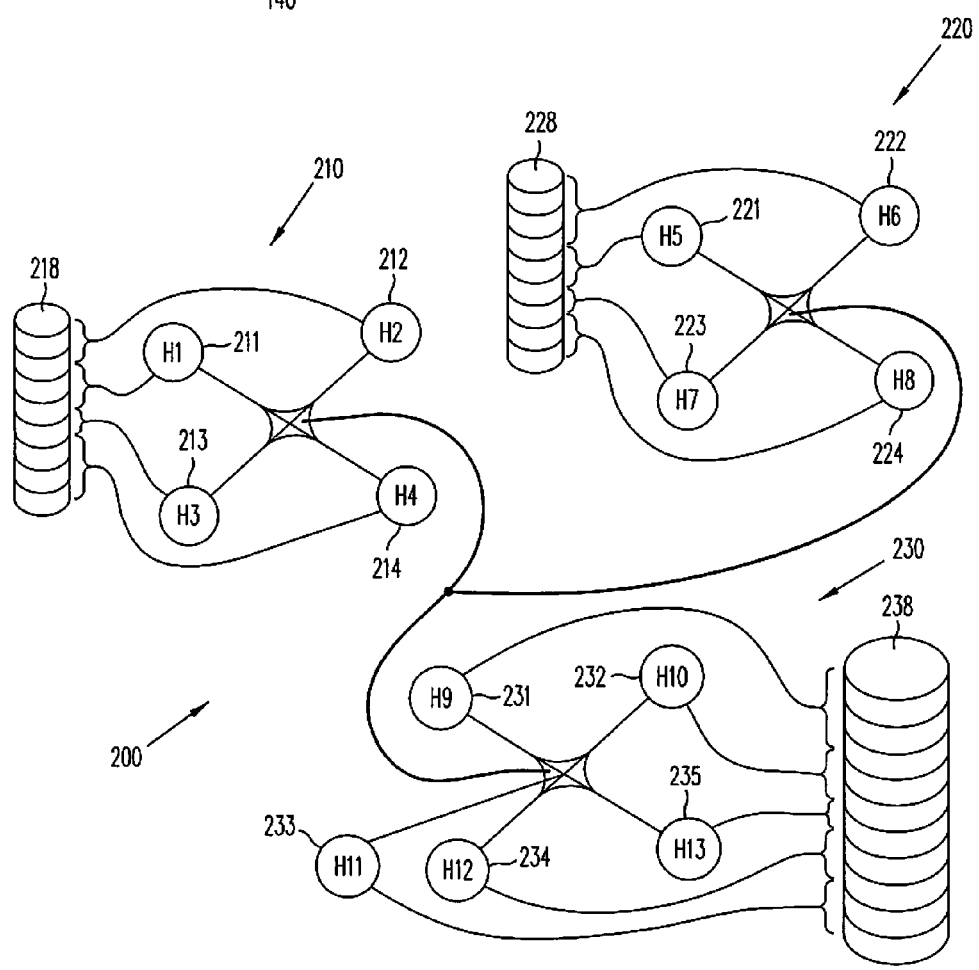
FIG. 2 is a block diagram of one implementation of a computing system with several host computers coupled together to process data stored on one or more data servers.

FIG. 2 is a block diagram of one implementation of a computing system 200 with several host computers coupled together to process data stored on one or more data servers. The hosts may be arranged in groups, with each group sharing one or more data servers. In the illustrated example, the computing system 200 includes three groups of host computers 210, 220, and 230 that together have thirteen host computers. Group 210 includes four hosts 211, 212, 213, and 214 (also labeled as H1, H2, H3, and H4, respectively). Group 220 includes four hosts 221, 222, 223, and 224 (also labeled as H5, H6, H7, and H8, respectively). Group 230 includes five hosts 231, 232, 233, 234, and 235 (also labeled as H9, H10, H11, H12, and H13, respectively). The groups may be interconnected, for example through a LAN, to allow communication among the various hosts.

Each group of hosts may include one or more data servers. In the illustrated example, each host in group 210 is connected with a data server 218. Similarly, each host in group 220 is connected with a data server 228, and each host in group 230 is connected with a data server 238. Each of the data servers 218, 228, and 238 may include one or more stand-alone data storage units. The data storage units may be high-volume storage devices such as disk arrays. In general, the data storage units may use magnetic disk, magnetic tape, optical disks, semiconductor memory, or other technologies, or combinations thereof, to store data to be processed by the computing system 200.

One of the issues that may arise in the design of distributed computing systems is the ability of the system to respond to a failed data processing host. For example, consider the situation where one host in a computing system fails during the processing of data. In general, the data to be processed by a distributed computing system is pre-assigned to the various available hosts in the computing system. When a host fails, the data that were pre-assigned to the failed host will not be processed, and the thus the overall job to be performed by the distributed system will not be completed unless some remedial measures are taken.

As an illustration, host 214 may fail during a data-processing run of computing system 200. Host 214 may then be considered a failed host. The failure may occur for a variety of reasons, including hardware failure, power loss, or network disruption, among others. Data server 218 may include one or more data partitions pre-assigned to host 214. The assigned data partitions may form a share-nothing database, in that host 214 has exclusive access to those pre-assigned data partitions. To respond to the failure of host 214, therefore, the computing system 200 may reassign the data partitions that were originally assigned to the failed host 214.

One approach to reassigning the data partitions is to select one of the surviving hosts that may readily access the data server 218. For example, the surviving host 211 may be able to process the data on the partitions that were assigned to the failed host 214 (in addition to the data partitions that were pre-assigned to the host 211). The computing system 200 may therefore reassign the partitions that were being processed by host 214 to host 211. Host 211 may then complete the processing that was to be performed by the failed host 214, allowing the overall processing job to be completed.

This approach, however, may significantly degrade the overall performance of the computing system 200. The pre-assignment of data partitions may have been made by a system operator so that the hosts in the computing system would have completed their respective processing tasks in approximately the same amount of time. Depending on how much processing was completed by host 214 prior to its failure, the reassignment of the associated data partitions to host 211 may double the amount of processing that then needs to be performed by host 211. Accordingly, host 211 may require double the time to process the newly reassigned partitions in addition to the pre-assigned partitions. Since the overall job may not be complete until each of the individual hosts has completed processing, this approach to responding to a failed host may double, or otherwise generally slow, the amount of time required for the system to complete the overall job.

Alternative approaches may be used to improve the response to failed hosts in a distributed computing environment. Instead of reassigning the partitions from a failed host to a single host, the response may reassign the partitions from a failed host to one or more available hosts, as described below. The response may consider various factors regarding the partitions to be reassigned and the hosts that are available when performing the reassignment. The reassignment of a partition from a failed host to an available host may be called a failover of the partition.

Figure 3:
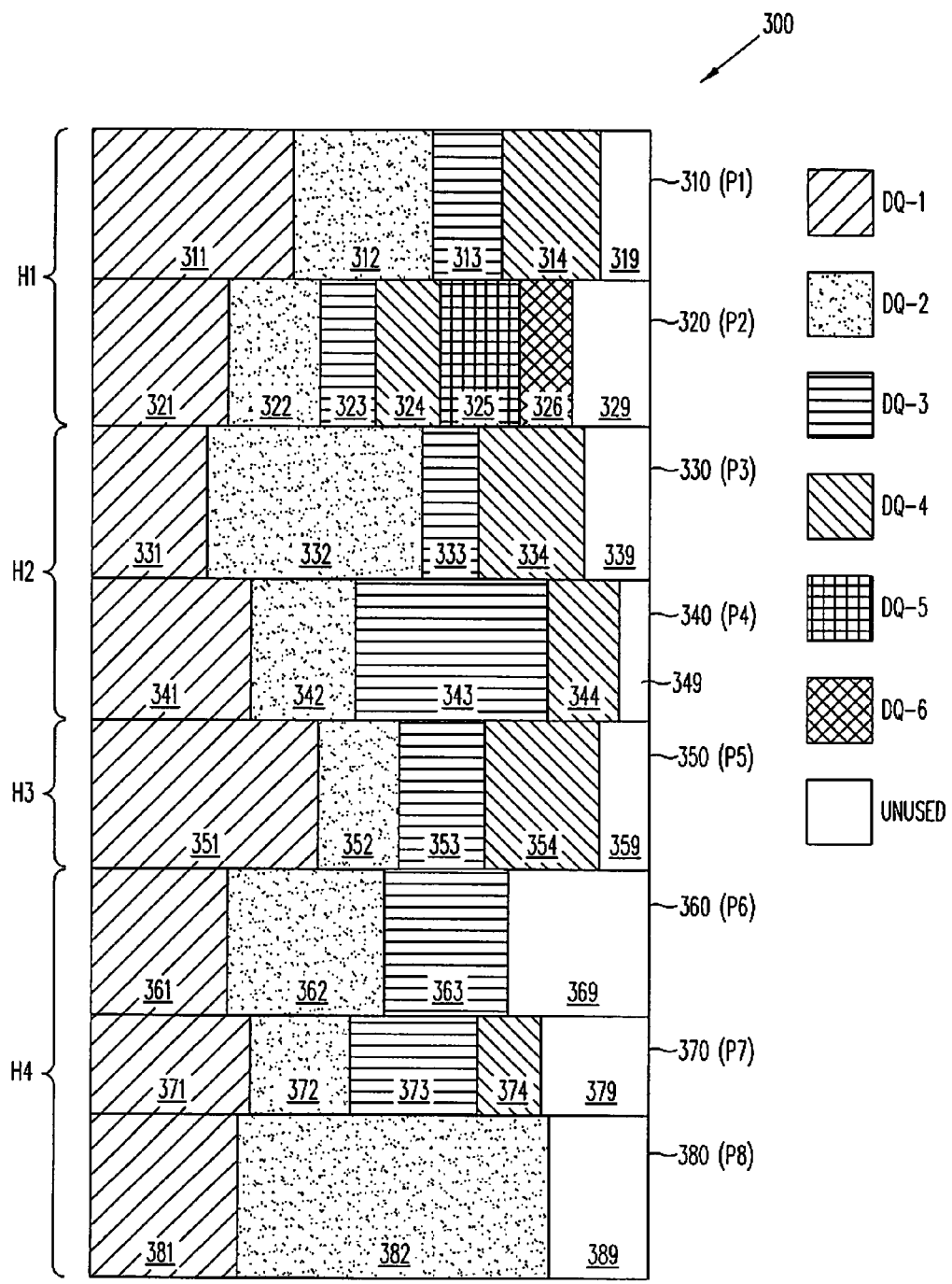
FIG. 3 is a block diagram of a data server showing an arrangement of data on the data server.

FIG. 3 is a block diagram of the data server 300 showing an example of an arrangement of data on the data server 300. In this example, the data server includes eight partitions P1 through P8. The partitions are made so that data on the server 300 may be assigned to separate hosts. In a share-nothing database architecture, each partition is assigned to a single host, which then has exclusive access to data in that partition. However, each host may be assigned to more than one partition. In the illustrated example, two of the partitions P1 and P2 have been assigned to a common host H1 (such as the host 211 from FIG. 2). Another two partitions P3 and P4 have been assigned to a second host, H2 (such as the host 212). Another partition P5 has been assigned to host H3 (such as the host 213), and three partitions P6, P7 and P8 have been assigned to a host H4 (such as the host 214).

Each partition includes quantities of data of one or more types of data. For example, partition P7 includes four data quantities 371-374. Partition P7 may also include unused storage 379. Each of the data quantities in a partition includes information that is related to or corresponds to information in one or more of the other data quantities of the same partition. For example, some of the data in data quantity 371 may be related to some of the data in data quantity 372, and to some of the data in data quantity 373, and to some of the data in data quantity 374.

As an example, the data in data quantity 371 may include a list of customer bank account numbers, the data in data quantity 372 may include names of the corresponding customers, the data in data quantity 373 may include addresses of the corresponding customers, and the data in data quantity 374 may include bank balances of the corresponding customers. Since the data in these data quantities are associated, the data partition P7 may not be easily subdivided. Subdividing the data partition P7 may require careful separation of the records. The various data entries for a single record (such as for a single customer) need to be kept together in a common partition, since these corresponding data need to be processed together by a single host.

Each partition may have different types of data, and different numbers of types of data. For example, partition P2 as illustrated includes six data quantities 321-326 with six different types of data, numbered DQ-1 through DQ-6. Partition P8, however includes only two data quantities 381-382 with two different types of data, numbered DQ-1 through DQ-2. Further, the types of data may be different among the partitions. For example, DQ-2 in partition P8 may contain a different type of information than DQ-2 in partition P2. Different data quantities may also have relatively different frequencies of access for the calculations being performed. For example, the data quantity 371 may include a list of customer bank account numbers, which may be accessed several times for each access of corresponding customer names in the data quantity 372.

Each data quantity in a partition may be characterized by various attributes. For example, each data quantity may have a data size, e.g., a quantity of the data measured in bytes. The data size for a data quantity may be identified by a variable DQ. Additionally, the data quantities may have different measures of relative importance or relative significance or relative loading in the context of the processing being performed on the data. These factors may be summarized as a weighting factor for each type of data, represented by a variable W.

Figure 4:
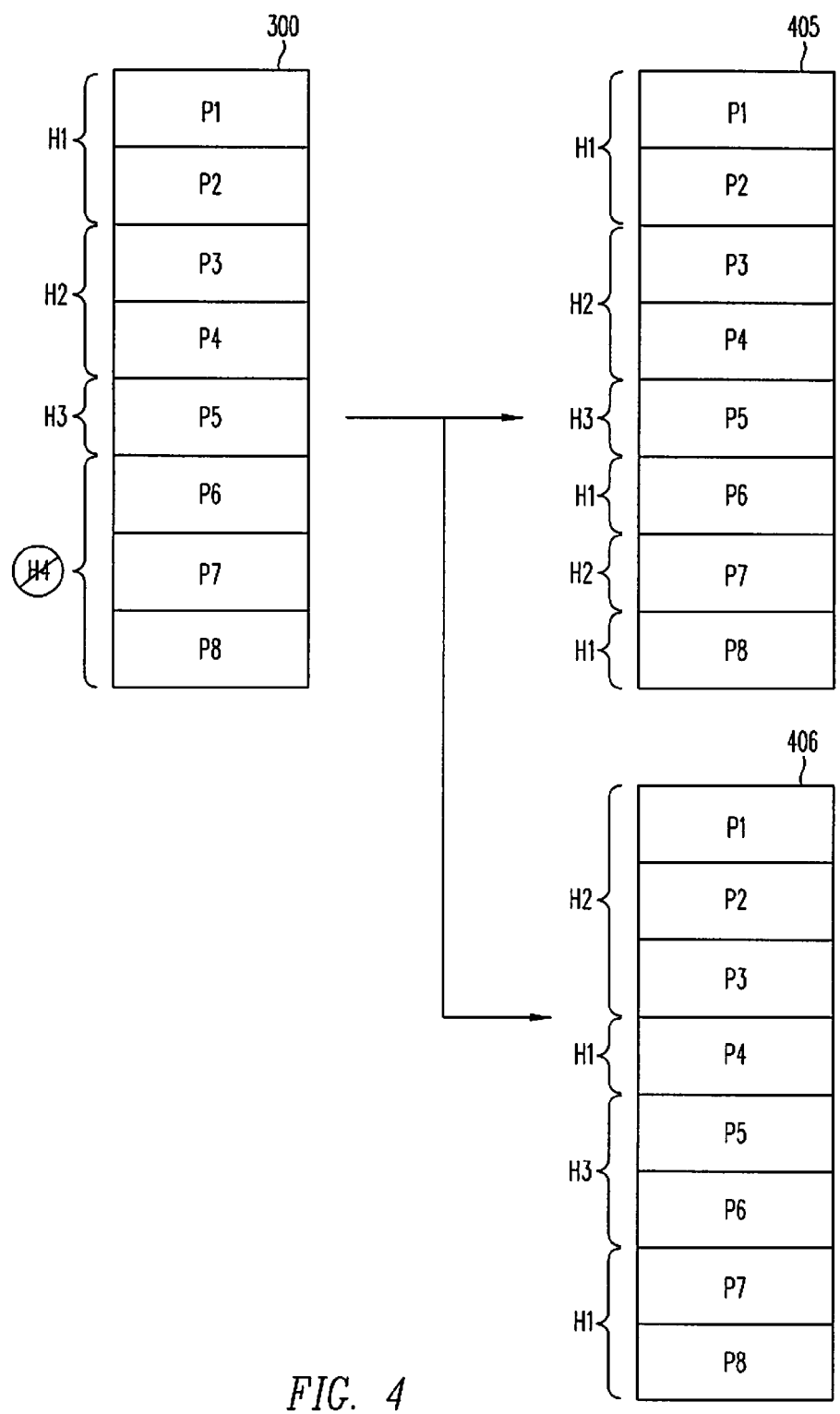
FIG. 4 is a block diagram illustrating reassignments of data partitions in a data server.

FIG. 4 is a block diagram illustrating reassignments of data partitions in a data server. The figure depicts a data server, such as the data server 300 from FIG. 3, that includes eight partitions P1 through P8. The figure also depicts two exemplary reassignments 405 and 406 of the data server, which may be made in response to the failure of a host. As indicated in the data server 300, two of the partitions P1 and P2 in this example were pre-assigned to a common host H1 (such as host 211 from FIG. 2). Another two partitions P3 and P4 were pre-assigned to a second host, H2 (such as host 212). Another partition P5 was pre-assigned to host H3 (such as host 213), and three partitions P6, P7 and P8 were pre-assigned to a host H4 (such as host 214). As depicted in the figure, one of the hosts H4 has failed. The pre-assigned partitions for the failed host H4 need to be reassigned to the three surviving hosts H1-H3. Additionally, unused redundant hosts, known as standby hosts may also be used in the reassignment of partitions of the failed host. Standby hosts (not shown) may be additional hosts in a cluster that are not initially assigned partitions, but which are available as back-up resources for use in response to a host failure.

A variety of techniques may be employed for reassigning the partitions in the data server 300. Two examples of such a reassignment are shown by the associations depicted for the reassignment 405 and the reassignment 406.

Reassignment 405 illustrates one implementation of a scheme for reassigning data partitions. Reassignment 405 may be termed as an example of an optimistic reassignment. In the reassignment 405, only the partitions that were previously assigned to the now-failed host H4 are assigned to one or more of the surviving hosts. Thus, partitions P1 and P2 remain assigned to host H1, partitions P3 and P4 remain assigned to host H2, and partition P5 remains assigned to host H3. Partition P6, P7, and P8, however, need to be reassigned, since they were previously assigned to the now-failed host H4. In the depicted example of reassignment 405, partitions P6 and P8 are reassigned to host H1, and partition P7 is reassigned to host H2.

Reassignment 406 illustrates another implementation of a scheme for reassigning data partitions. Reassignment 406 may be termed as an example of an exhaustive reassignment. In the reassignment shown by reassignment 406, the partitions are assigned to the surviving hosts without regard to their previous assignments. In the example shown by reassignment 406, partitions P1 through P3 are reassigned to host H2. Partitions P4, P7, and P8 are reassigned to host H1. Partitions P5 and P6 are assigned to host H3.

The reassignment 406 may allow for improved optimization in comparison with the reassignment 405. In some situations, the reassignment 406 may allow an overall job to be completed in less time than would the reassignment 405. This improvement may arise because reassignment 406 is not constrained in the same way as reassignment 405. Since reassignment 406 is free to make the best allocations of available hosts among all of the partitions (instead of just among the partitions associated with a failed host) the reassignment 406 may make better use of the surviving hosts H1 through H3 when deciding which host is best suited for each of the partitions. However, the reassignment depicted in reassignment 406 may involve a more complicated transition before the hosts may resume data calculations. The added complexity may arise through several factors. For example, each of the partitions P1 through P8 needs to be reassigned in the reassignment 406. In contrast, the reassignment 405 only involves the data partitions that were previously associated with a host that has failed. Additionally, the reassignments shown by reassignment 406 may generally involve an interruption of data calculations for partitions, such as partitions P1 through P5, that were assigned to surviving and operating hosts. The added complexity of assignment 406 may add to time needed to return to respond to a failure of a host and resume regular processing, in comparison with the reassignment 405. These and other considerations may be used by system designers in selecting between types of reassignment to be performed. Alternatively, system designers may configure a system with options to perform both types of reassignment, and with the ability to select between these options as best suited for a particular situation.

Figure 5:
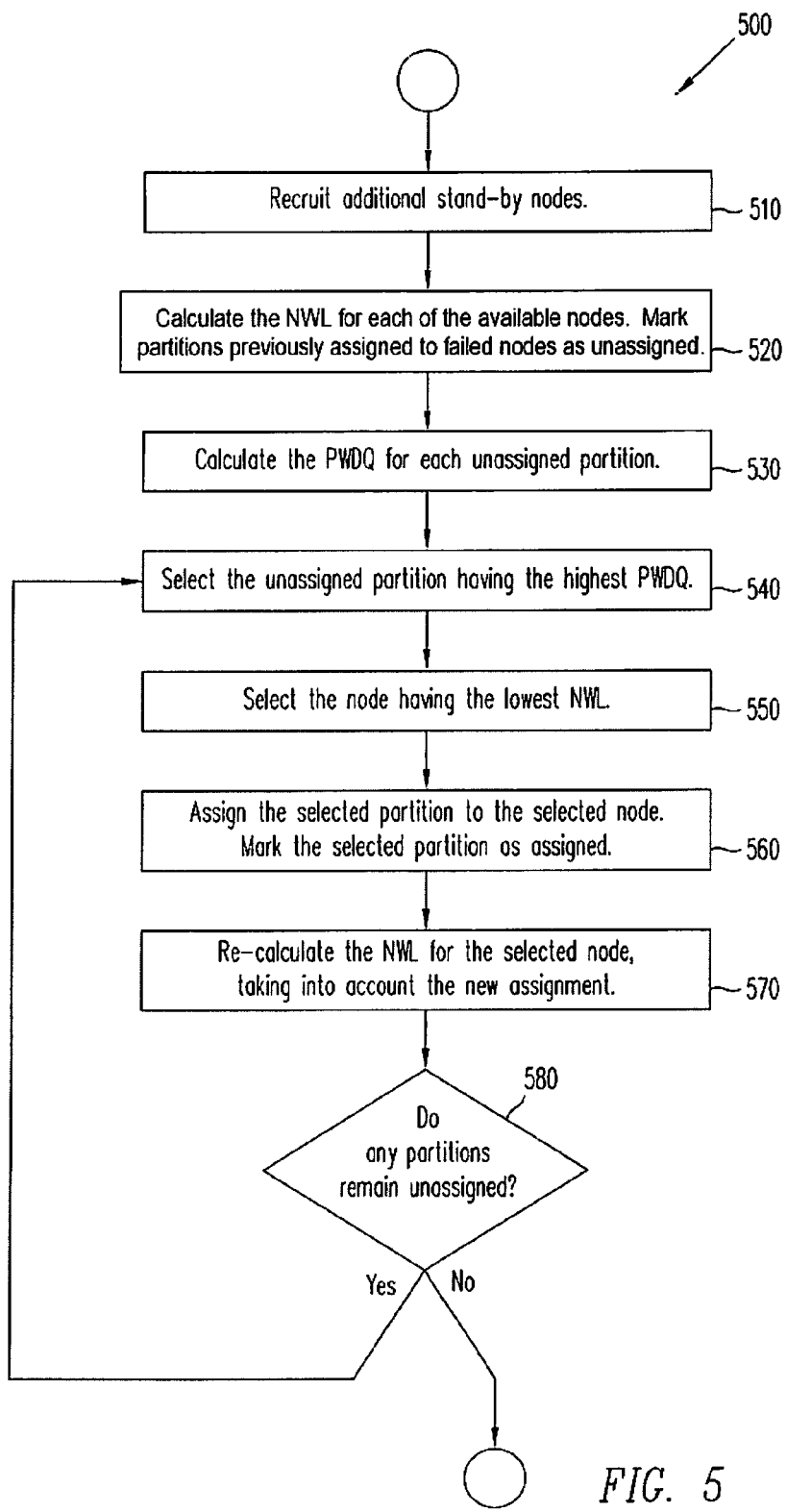
FIG. 5 is a flow diagram of one implementation of a procedure for reassigning data partitions after the failure of one or more data processing hosts.

FIG. 5 is a flow diagram of one implementation of a procedure 500 for reassigning data partitions after the failure of one or more data processing hosts. The procedure 500 may reassign the data partitions from the failed host to available hosts in such a way as to balance the resulting workloads among the available hosts.

One approach to load balancing involves assigning the partitions that hold the heaviest data processing loads to the least busy hosts. For example, load balancing may involve assigning partitions with the largest partition's weighted data quantity (PWDQ) to hosts with the smallest normalized work load (NWL). A PWDQ may be calculated for a partition as a refined measure of the amount of data on the partition that remains to be processed. An NWL may be calculated for a host as a refined measure of the current processing load on the host. In various implementations of the procedure 500, the PWDQ may represent a total amount of processing to be performed on a partition, and the NWL may be a calculated or estimated metric that varies linearly with the expected time for completion of the partitions assigned to a host.

The procedure 500 reassigns only data partitions that were previously assigned to the failed host. Thus, the procedure 500 maintains the assignments of partitions that were previously assigned to surviving hosts. Procedure 500 may therefore reassign data partitions as illustrated in the reassignment 405 from FIG. 4.

In addition to using the surviving hosts for reassigning data partitions, the procedure 500 may also recruit additional standby hosts. The procedure 500 may thus commence in act 510 by recruiting additional hosts from among any redundant standby hosts. The hosts available for reassigning data partitions may therefore include one or more standby hosts in addition to the surviving hosts.

In act 520, the NWLs are then calculated for each of the available hosts. In act 530, the PWDQs are calculated for each of the data partitions that need to be assigned to a host. In the procedure 500, these unassigned data portions are the data partitions that were previously assigned to the now-failed host. The PWDQ calculations for these partitions may be based on data that still require processing, and may exclude portions of a partition that were already processed prior to the failure of the host.

Act 540 selects a partition with the highest PWDQ from among the data partitions remaining to be assigned to a host. Act 550 selects a host having the lowest NWL among the available hosts. In act 560, the selected partition (from act 540) is assigned to the selected host (from act 550). The selected partition is thenceforth no longer considered to be an unassigned partition. In act 570, the NWL is re-calculated for the selected host, taking into account the PWDQ (or other appropriate factors) of the data partition that was assigned to the selected host in act 560.

A determination is then made in act 580 whether any partitions still need to be assigned to a host. If any unassigned partitions remain, the procedure 500 loops back to act 540 to select a remaining unassigned partition. If act 580 determines that all partitions have been assigned, the procedure 500 terminates.

The procedure 500 from FIG. 5 may be used in the computing system 200 from FIG. 2 to perform failovers of data partitions as a recovery response in the event that one of the host computers H1-H13 fails. For example, if host 114 should fail, then the procedure 500 may be used to reassign data partitions to the surviving hosts H1-H3 that are in the same group of hosts 210 as the failed host H4. The abandoned partitions from host H4 may be reassigned to these surviving hosts H1-H3 because these hosts H1-H3 share data server(s) with the failed host H4.

A review of FIG. 2 illuminates some considerations that may be used by system designers configuring a distributed computing system. As an initial consideration, the number of hosts assigned to a group may generally be based upon the available input/output bandwidth supported by a data server. The computing system 200 is illustrated by way of example with thirteen separate hosts, assigned to three separate groups. Alternative assignments are possible, with more or fewer groups in the system. Configuring the system with more groups generally means that fewer hosts are deployed in each group, and vice-versa. For example, the thirteen hosts may be deployed in five groups, with 3, 3, 3, 2, and 2 hosts in each group. As another example, the thirteen hosts may be deployed in two groups, with 5 and 8 hosts in each group. Various performance tradeoffs may exist in these deployments. For example, having a larger number of hosts in each group may allow improved system performance in the event of a failover, since more hosts are available in a group to share the load of a failed host. However, more hosts are concomitantly disrupted during each failover. Also, a failover may be more complicated and create larger delays when more hosts are involved in the failover. Further, increasing the number of hosts in a group may provide diminishing returns. For example, if one host fails in a group of five hosts, each of the surviving four hosts may experience and increased load of perhaps 25%, for example. This relatively small burden would only be somewhat reduced—to perhaps 20%, for example—if the group originally had six hosts instead of five. These and other considerations may be used by system designers in determining the appropriate number of hosts to be deployed in each group of hosts.

The PWDQ calculation in act 530 from FIG. 5 may be performed according to a variety of approaches. One example of a PWDQ for a partition may be based upon measures relating to each of the data quantities on the partition. For example, a PWDQ for partition may be calculated based on the data sizes DQ of the data quantities on the partition. The PWDQ may also be calculated based on the weighting factors W for the types of data in data quantities on the partition. In one formulation, the PWDQ is based on weighted data quantities (WDQ) for each of the data quantities on the partition, which combine both the data sizes and the weighting factors of a data quantity. The weighted data quantities may be represented by a variable WDQ according to the following equation:

$$WDQ(i,j)=W(i,j)\times DQ(i,j). \quad \text{(eqn. 1)}$$

In this expression, j is an index for the partitions of data, and i is an index for the data quantities on a partition of data. Here, the variables DQ, W, and WDQ are each indexed by i and j, since the data sizes and the weighting factors may be different for each of the data quantities on each of the different partitions. In this example, the weighted data quantities are the product of the data sizes and the weighting factors. Thus, the weighted data quantity for a data quantity 363 in FIG. 3 may be represented by $WDQ(3,6)=W(3,6)\times DQ(3,6)$, since the data quantity 363 is indexed as the DQ-3 on partition P6.

A more general relationship is also envisioned, so that eqn. 1 may have the form $WDQ(i, j)=F[W(i, j), DQ(i, j)]$. In this generalized formulation, the function F may be configured as needed based on various system implementations.

The weighting factor W for a type of data may depend on the type of access (read only, read and update, read and delete, etc.) that is made to the type of data. The weighting factor may also depend on the frequency of access of that is expected for a type of data. For example, with reference to FIG. 3, a calculation being performed in an overall job may access the customer bank account numbers in data quantity 371 many times more often than the address information in data quantity 372. In such a situation, the weighting factor for data quantity 371 may be made corresponding larger than the weighting factor for data quantity 372, in order to reflect the relative processing-intensiveness that is associated with each kilobyte (or other metric) of data quantity 371. The weighting factor may be manually estimated or automatically measured to reflect the type of access and the frequency of access for a type of data.

The weighting factor may also depend on a criticalness of a type of data to the database in a calculation. This criticalness consideration may be a manually or automatically calculated factor that is based on the High Availability (HA) aspect of the type of data and on the responsiveness needed for the type of data. For example, data in database catalog tables may be considered to have the highest criticalness because an overall calculation may be unable to proceed if the database catalog information is not available. By enhancing the weighting factor (and concomitantly, an overarching PWDQ) based on the criticalness of a type of data, an assignment or reassignment performed according to procedure 500 may (a) somewhat reduce the workload of hosts that handle large quantities of critical data, thereby enhancing the response time of those hosts, and (b) enhance the likelihood that the partitions with large quantities of critical data are prioritized when several data partitions need to be failed over to new hosts.

The PWDQ for a partition may be based on each of the individual weighted data quantities of the partition, as represented by the variable PWDQ in the following expression:

$$PWDQ(j)=\Sigma_i WDQ(i,j). \quad \text{(eqn. 2)}$$

In this example, the PWDQ for a partition is the sum of each of the weighted data quantities on the partition. In a more specific example of a calculation for a partition, eqn. 2 may take the form $PWDQ(j)=\Sigma_i W(i, j)\times DQ(i, j)$. A more general relationship is also envisioned, so that eqn. 2 may have the form $PWDQ(j)=G[WDQ(1, j), WDQ(2, j), \ldots]$. In this generalized formulation, the function G may be configured as needed based on various system implementations.

The NWL calculation in act 520 from FIG. 5 may be performed according to a variety of approaches. Examples of an NWL for a host may include measures relating to (a) the overall processing power of the host, and (b) the existing processing load that has already been assigned to the host. The overall processing power may be based on, for example, a measure of the host's computational performance capacity. This capacity may be measured in millions of instructions per second (MIPS) or a similar metric.

Alternatively, or in addition, the overall processing power may be a processing resource (PR) metric. A PR of a host may be a normalized number that describes the host's processing power in comparison with other hosts. The PR may be calculated using a variety of techniques, and may provide a measure of the relative processing power among the different hosts in a share-nothing database management system (SN- DBMS). The PR may be a calculated or estimated metric that varies linearly with the expected time for a host to complete a standardized task.

The existing processing load on a host may be measured, for example, in terms of the total number of bytes of data to be processed by the host. Alternatively, the existing processing load may be measured by the PWDQ of partitions that have been assigned to the host.

One example of an NWL is represented by the following expression:

$$NWL(k) = \frac{\sum_j PWDQ(j)}{PR(k)} \quad \text{(eqn. 3)}$$

In this expression, k is an index for a host whose NWL is being calculated, and j is an index for the partitions of data assigned to the host k. Here, the variable NWL(k) represents the normalized workload of the k'th host. In this example, the NWL for a host is the sum of each of the PWDQs for the assigned partitions, divided by the PR of the host. Thus, the NWL for the host H2 in FIG. 3 may be represented by:

$$NWL(2) = \frac{PWDQ(3) + PWDQ(4)}{PR(2)},$$

since the host H2 has been assigned partitions P3 and P4.

In a more specific example of a calculation of the NWL of a host, eqn. 3 may take the form:

$$NWL(k) = \frac{\sum_j \sum_i W(i, j) \times DQ(i, j)}{PR(k)}.$$

In this expression, k is an index for a host whose NWL is being calculated, j is an index for the partitions of data assigned to the host k, and i is an index for the data quantities on the j'th partition of data.

A more general relationship is also envisioned for calculations of the NWL, so that eqn. 3 may have the form NWL(k) =H[PR(k);PWDQ(j1), PWDQ(j2), . . . ]. In this generalized formulation, the index k refers to a host whose NWL is being calculated, the indices j1, j2, . . . represent the partitions assigned to the host k, and the function H may be configured as needed based on various system implementations.

Figure 6:
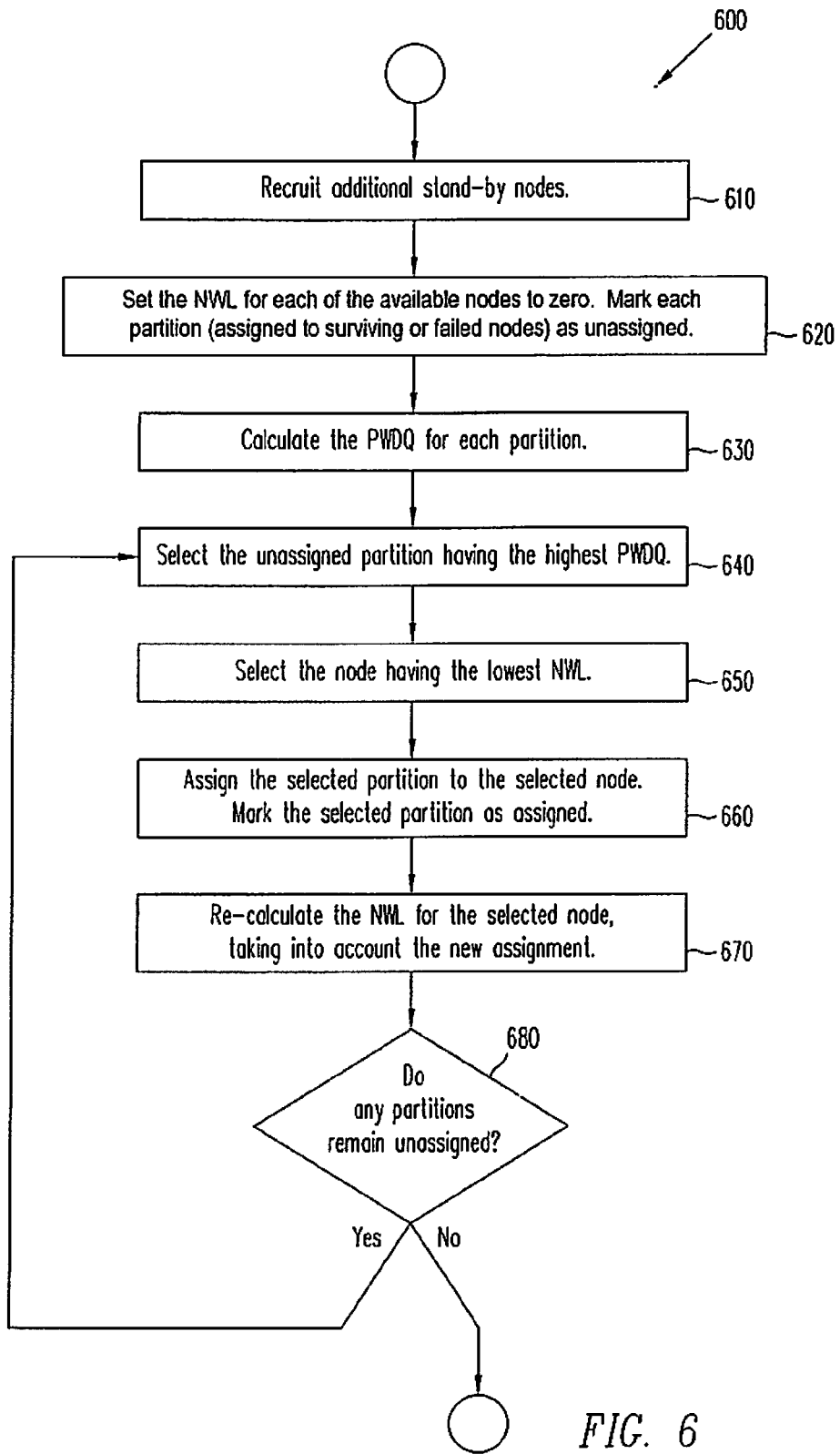
FIG. 6 is a flow diagram of a second implementation of a procedure for reassigning data partitions after the failure of one or more data processing hosts.

FIG. 6 is a flow diagram of a second implementation of a procedure for reassigning data partitions after the failure of one or more data processing hosts. The procedure 600 reassigns all the data partitions that were used on a data server for an overall job after the failure of one or more hosts associated with the data server. Thus, the procedure 600 reassigns partitions that were previously assigned to surviving hosts as well as data partitions that were previously assigned to the now-failed host. Procedure 600 may therefore reassign data partitions as illustrated in the reassignment 406 from FIG. 4.

In addition to using the previously-assigned hosts for reassigning data partitions, the procedure 600 may also recruit additional standby hosts. The procedure 600 may thus commence in act 610 by recruiting additional hosts from among any redundant standby hosts. The hosts available for reassigning data partitions may therefore include one or more standby hosts in addition to the surviving hosts.

In procedure 600, the data partitions are reassigned to all of the available hosts. Each of the partitions is thus initially considered to be unassigned, and therefore none of the available hosts are considered initially to have any assigned data partitions. In act 620, the NWLs are accordingly set to zero for each of the available hosts. In act 630, the PWDQs are calculated for each of the data partitions, all of which initially need to be assigned to a host in the procedure 600.

Act 640 selects a partition with the highest PWDQ from among the data partitions remaining to be assigned to a host. Act 650 selects a host having the lowest NWL among the available hosts. In act 660, the selected partition (from act 640) is assigned to the selected host (from act 650). The selected partition is thenceforth no longer considered to be an unassigned partition. In act 670, the NWL is re-calculated for the selected host, taking into account the PWDQ (or other appropriate factors) of the data partition that was assigned to the selected host in act 660. A determination is then made in act 680 whether any partitions still need to be assigned to a host. If any unassigned partitions remain, the procedure 600 loops back to act 640 to select a remaining unassigned partition. If act 680 determines that all partitions have been assigned, the procedure 600 terminates. Although FIG. 6 has been described as a response to a failed host, it is noted that this procedure may be adapted to automate the initial assignment of data partitions to data processing hosts.

Figure 7:
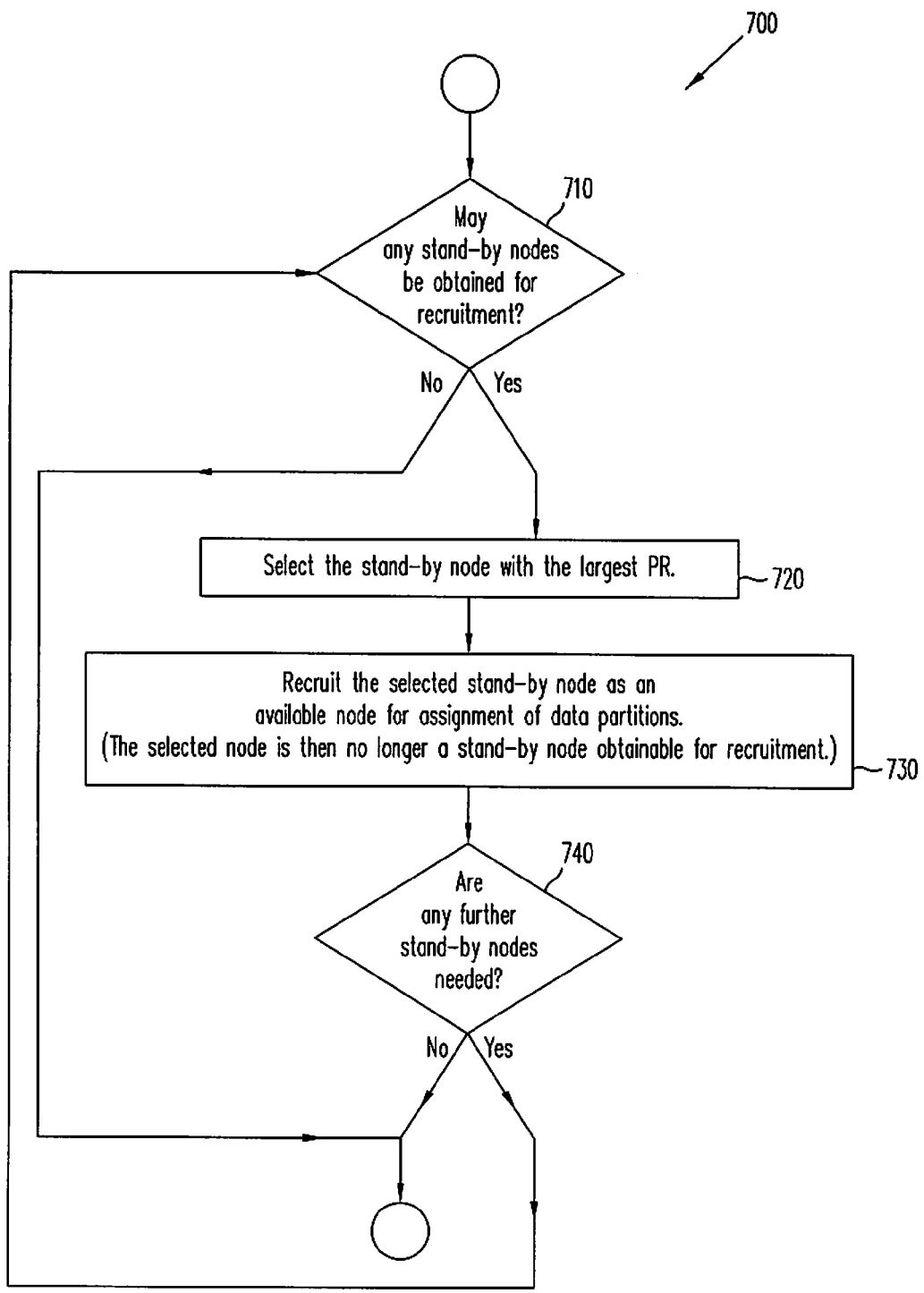
FIG. 7 illustrates one implementation of a procedure for recruiting standby hosts.

FIG. 7 illustrates one implementation of a procedure 700 for recruiting standby hosts for replacing the processing power that has been lost by the failure of a host in a distributed processing environment. The procedure 700 may be used, for example, in acts 510 and 610 at the beginning of the procedures illustrated in FIGS. 5 and 6. If any standby hosts are accessible for use, the procedure 700 may recruit some or all of those standby hosts, depending on the amount of processing power that is needed to compensate for the processing power that was lost with the failed host. To recruit these standby hosts, the procedure 700 evaluates each standby host in turn, in order of decreasing PR. The evaluations are performed for each standby host in separate iterations of a loop shown in FIG. 7.

The procedure 700 may commence in act 710 with a determination of whether any standby hosts may be obtained to compensate for the failed host. If one or more standby hosts may be obtained, the procedure 710 advances to act 720. Otherwise, the procedure terminates. It is possible for several reasons that no standby hosts may be obtained. For example, the initial arrangement of hosts may not have designated any hosts as standby hosts. Also, the initial arrangement of hosts may have designated some standby hosts, but those hosts may have already been recruited in previous iterations of the loop in the procedure 700. If the procedure terminates because act 710 determines that no standby hosts may be obtained, subsequent failover measures (such as the subsequent acts in procedures 500 and 600) will need to employ at least one of the surviving previously-assigned hosts to fully compensate for the failed host.

Act 720 selects a host with the highest PR from among the obtainable standby hosts. This host is then recruited in act 730 as an available host that may be used to compensate for the failed host. This host is then no longer considered to be obtainable for recruitment (in subsequent iterations of act 710).

Act 740 may then makes a determination of whether additional stand-by hosts are needed to compensate for the failed host. This determination may be based on a comparison between (a) the sum of PRs for all the standby hosts that have already been recruited (through iterations of act 730) and (b)

the PR of the failed host (or, if more than one host has failed, the sum of PRs for all of the failed hosts). If the sum of PRs of all the recruited standby hosts is less than the PR of the failed host, then the procedure 700 loops back to act 710 in an attempt to recruit an additional standby host. Otherwise, the procedure 700 terminates, having recruited enough standby hosts that subsequent failover measures will not need to employ the surviving hosts to fully compensate for the failed host.

Various embodiments of the present invention may be implemented as software programs executing on one or more computer systems. Persons skilled in the art, however, will readily recognize that the equivalent of such software may also be constructed in hardware. If the invention is implemented in a computer program using programming instructions executable on a computer processor, the program may be stored in a conventional computer readable medium, which may include, for example: magnetic storage media such as a magnetic disk (e.g., a floppy disk or a hard drive) or magnetic tape; optical storage media such as an optical disk, optical tape, or machine readable bar code; solid state electronic storage devices such as volatile or nonvolatile random access memory (RAM) or read-only memory (ROM); or other physical devices or media employed to store instructions of a computer program, or combinations thereof.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   detecting failure of a failed host of a plurality of hosts, wherein
      the failed host is assigned exclusive access to a first subset of partitions of a plurality of partitions, and
      the first subset of partitions comprises a first unassigned partition and a second unassigned partition, after failure;
   selecting a reassignment operation of a plurality of available reassignment operations, wherein
      the plurality of available reassignment operations comprises an optimistic reassignment operation and an exhaustive reassignment operation, and
      the optimistic reassignment operation comprises
         reassigning the first subset of partitions of the plurality of partitions to the plurality of hosts; and
         persisting existing assignments of a second subset of partitions of the plurality of partitions among the plurality of hosts; and
   performing the reassignment operation, wherein
      the selecting and the performing are performed in response to the detecting, and
      the reassignment operation comprises
         calculating a first value associated with a first host of the plurality of hosts, wherein
            the first host has exclusive access to a first data partition,
            the first value is based at least in part on
               a first processing power of the first host, and
               a first processing requirement for a first quantity of data on the first data partition, wherein the first processing requirement depends at least in part on a product of:
                  a size of the first quantity of data, and
                  a weighting factor based at least in part on an access characteristic of the first quantity of data, and
         calculating a second value associated with a second host of the plurality of hosts, wherein
            the second value is based at least in part on
               a second processing power of a second host;
         comparing the first and second values, wherein the comparing is performed by a processor;
         calculating a third value associated with the first unassigned partition, wherein
            the third value depends at least in part on a product of:
               a size of a quantity of data in the first unassigned partition, and
               a weighting factor based at least in part on an access characteristic of the data in the first unassigned partition, and
         calculating a fourth value associated with the second unassigned partition, wherein
            the fourth value depends at least in part on a product of:
               a size of a quantity of data in the second unassigned partition, and
               a weighting factor based at least in part on an access characteristic of the data in the second unassigned partition,
         comparing the third and fourth values, wherein the comparing is performed by the processor; and
         assigning, in response to the comparing the first and second values and the comparing the third and fourth values, exclusive access of one of the first unassigned partition and the second unassigned partition to one of the first and second hosts.

2. The method of claim 1, wherein:
   the second host is a standby host;
   the second host has exclusive access to a second data partition; and
   the second value is further based at least in part on a second processing requirement for a second quantity of data on the second data partition.

3. The method of claim 2, wherein the first and second values are normalized work loads (NWLs), the first and second processing powers are processing resource (PR) metrics, and the first and second processing requirements are partition-weighted data quantities (PWDQ).

4. The method of claim 3 wherein the first and second NWLs are calculated according to the following formulas:

$$NWL(k) = \frac{\sum_j PWDQ(j)}{PR(k)},$$

$PWDQ(j) = \Sigma_i WDQ(i,j)$, and $WDQ(i,j) = W(i,j) \times DQ(i,j)$, wherein k is an index for the first and second hosts,
j is an index for data partitions assigned to a host,
i is an index for categories of information on a partition,
NWL(k) represents the NWL of the kth host,
PWDQ (j) represents a PWDQ for a jth partition of data,
PR(k) represents the PR of the kth host,
WDQ (i, j) represents a weighted data quantity of an ith category of information on a jth partition of data,
W(i, j) represents a weighting factor of an ith category of information on a jth partition of data, and DQ(i, j) represents a quantity of data in an ith category of information on a jth partition of data.

5. The method of claim 1, wherein the calculating the first and second values, the calculating the third and fourth values, comparing the first and second values, comparing the third and fourth values, and assigning are performed in response to a failure of a third host to which the data partition was previously assigned.

6. The method of claim 1, wherein the first value is a measure of an expected time to complete processing of pre-existing tasks on the first host.

7. The method of claim 1, wherein the first processing power of the first host is indicative of a relative time for the first host to complete a standardized task.

8. The method of claim 1, wherein:
the second host is a standby host; and
the first value is a measure of an expected time to complete processing of pre-existing tasks on the first host.

9. The method of claim 1, wherein:
the first processing requirement for the first quantity of data is indicative of an amount of processing to be performed for the first data partition; and
the access characteristic of the first quantity of data comprises a type of access to be made to the first quantity of data, based on a type of the first quantity of data.

10. The method of claim 1, wherein:
the assigning comprises assigning exclusive access of the third data partition to the first host only if the comparing first and second values indicates that the first value is less than the second value and the comparing the third and fourth values indicates that the fourth value is less than the third value; and
the access characteristic of the first quantity of data comprises
a frequency of access to be made to the first quantity of data, based on a type of the first quantity of data.

11. A system comprising:
at least one host of a plurality of hosts, wherein
each host of the plurality of hosts comprises a respective processor, and
the system is configured to
detect failure of a failed host, wherein
the failed host is assigned exclusive access to a first subset of partitions of a plurality of partitions, and
the first subset of partitions comprises a first unassigned partition and a second unassigned partition, after failure;
select a reassignment operation of a plurality of available reassignment operations, wherein
the plurality of available reassignment operations comprises an optimistic reassignment operation and an exhaustive reassignment operation, and
the optimistic reassignment operation comprises
reassigning the first subset of partitions of the plurality of partitions to the plurality of hosts; and
persisting existing assignments of a second subset of partitions of the plurality of partitions among the plurality of hosts;
perform the reassignment operation, wherein
selecting and performing the reassignment operation are performed in response to detecting the failure, and
the reassignment operation comprises
calculating a first value associated with a first host of the plurality of hosts, wherein
the first host has exclusive access to a first data partition,
the first value is based at least in part on
a first processing power of the first host, and
a first processing requirement for a first quantity of data on the first data partition, wherein the first processing requirement depends at least in part on a product of:
a size of the first quantity of data, and
a weighting factor based at least in part on an access characteristic of the first quantity of data, and
calculating a second value associated with a second host of the plurality of hosts, wherein
the second value is based at least in part on a second processing power of a second host;
comparing the first and second values, wherein the comparing is performed by a processor;
calculating a third value associated with the first unassigned partition, wherein
the third value depends at least in part on a product of:
a size of a quantity of data in the first unassigned partition, and
a weighting factor based at least in part on an access characteristic of the data in the first unassigned partition, and
calculating a fourth value associated with the second unassigned partition, wherein
the fourth value depends at least in part on a product of:
a size of a quantity of data in the second unassigned partition, and
a weighting factor based at least in part on an access characteristic of the data in the second unassigned partition,
comparing the third and fourth values, wherein the comparing is performed by the processor; and
assigning, in response to the comparing the first and second values and the comparing the third and fourth values, exclusive access of one of the first unassigned partition and the second unassigned partition to one of the first and second hosts.

12. The system of claim 11, wherein the first processing requirement is based at least in part on weighted data quantities WDQ determined according to the following equation:

$$WDQ(i)=W(i) \times DQ(i), \text{ wherein}$$

i is an index for categories of information on the first partition,
W(i) represents a weighting factor of an ith category of information on the first partition,
W(i) is based at least in part on the access characteristic of the ith category of information on the first partition, and
DQ(i) represents a quantity of data in an ith category of information on the first partition.

13. The system of claim 11, wherein
the system is further configured to assign the exclusive access based at least in part on a failure of the third host.

14. The system of claim 11, wherein the access characteristic of the first quantity of data comprises:
a type of access to be made to the first quantity of data, based on a type of the first quantity of data, and
a frequency of access to be made to the first quantity of data, based on the type of the first quantity of data.

15. The method of claim 1, wherein the access characteristic of the first quantity of data comprises:
a type of access to be made to the first quantity of data, based on a type of the first quantity of data, and a frequency of access to be made to the first quantity of data, based on the type of the first quantity of data.

16. The method of claim 1, wherein the measure of computational performance capacity is measured in millions of instructions per second (MIPS).

17. The method of claim 1, wherein the weighting factor is based at least in part on a calculated criticality factor of the first quantity of data.

18. A memory storing instructions, wherein a computer system implements a method in response to executing the instructions, the method comprising:
   detecting failure of a failed host of a plurality of hosts, wherein
      the failed host is assigned exclusive access to a first subset of partitions of a plurality of partitions, and
      the first subset of partitions comprises a first unassigned partition and a second unassigned partition, after failure;
   selecting a reassignment operation of a plurality of available reassignment operations, wherein
      the plurality of available reassignment operations comprises an optimistic reassignment operation and an exhaustive reassignment operation, and
      the optimistic reassignment operation comprises
         reassigning the first subset of partitions of the plurality of partitions to the plurality of hosts; and
         persisting existing assignments of a second subset of partitions of the plurality of partitions among the plurality of hosts; and
   performing the reassignment operation, wherein
      the selecting and the performing are performed in response to the detecting, and
      the reassignment operation comprises
         calculating a first value associated with a first host of the plurality of hosts, wherein
            the first host has exclusive access to a first data partition,
            the first value is based at least in part on
               a first processing power of the first host, and
               a first processing requirement for a first quantity of data on the first data partition, wherein the first processing requirement depends at least in part on a product of:
                  a size of the first quantity of data, and
                  a weighting factor based at least in part on an access characteristic of the first quantity of data, and
         calculating a second value associated with a second host of the plurality of hosts, wherein
            the second value is based at least in part on
               a second processing power of a second host;
         comparing the first and second values, wherein the comparing is performed by a processor;
         calculating a third value associated with the first unassigned partition, wherein
            the third value depends at least in part on a product of:
               a size of a quantity of data in the first unassigned partition, and
               a weighting factor based at least in part on an access characteristic of the data in the first unassigned partition, and
         calculating a fourth value associated with the second unassigned partition, wherein
            the fourth value depends at least in part on a product of:
               a size of a quantity of data in the second unassigned partition, and
               a weighting factor based at least in part on an access characteristic of the data in the second unassigned partition,
         comparing the third and fourth values, wherein the comparing is performed by the processor; and
         assigning, in response to the comparing the first and second values and the comparing the third and fourth values, exclusive access of one of the first unassigned partition and the second unassigned partition to one of the first and second hosts.

19. The memory of claim 18, wherein:
   the second host is a standby host and has exclusive access to a second data partition; and
   the second value is further based at least in part on a second processing requirement for a second quantity of data on the second data partition.

20. The memory of claim 19, wherein the first and second values are normalized work loads (NWLs), the first and second processing powers are processing resource (PR) metrics, and the first and second processing requirements are partition-weighted data quantities (PWDQ).

21. The memory of claim 20 wherein the first and second NWLs are calculated according to the following formulas:

$$NWL(k) = \frac{\sum_{j} PWDQ(j)}{PR(k)},$$

$$PWDQ(j) = \Sigma_i WDQ(i,j), \text{ and}$$

$$WDQ(i,j) = W(i,j) \times DQ(i,j), \text{ wherein}$$

k is an index for the first and second hosts,
j is an index for data partitions assigned to a host,
i is an index for categories of information on a partition,
NWL(k) represents the NWL of the kth host,
PWDQ (j) represents a PWDQ for a jth partition of data,
PR(k) represents the PR of the kth host,
WDQ (i, j) represents a weighted data quantity of an ith category of information on a jth partition of data,
W(i, j) represents a weighting factor of an ith category of information on a jth partition of data, and
DQ(i, j) represents a quantity of data in an ith category of information on a jth partition of data.

22. The method of claim 1, wherein the exhaustive reassignment operation comprises:
   reassigning the first subset of partitions of the plurality of partitions to the plurality of hosts; and
   reassigning a second subset of partitions of the plurality of partitions to the plurality of hosts.

* * * * *